April 30, 1968    W. F. WILLIAMS    3,380,654
DRIVE MECHANISM FOR A MECHANICAL COUNTER
Filed May 11, 1967

INVENTOR.
WINSTON F. WILLIAMS
BY *Merv Moody*
ATTORNEY

United States Patent Office 3,380,654
Patented Apr. 30, 1968

3,380,654
DRIVE MECHANISM FOR A MECHANICAL COUNTER
Winston F. Williams, Cedar Rapids, Iowa, assignor to Collins Radio, Cedar Rapids, Iowa, a corporation of Iowa
Filed May 11, 1967, Ser. No. 637,845
4 Claims. (Cl. 235—143)

ABSTRACT OF THE DISCLOSURE

A counter mechanism which allows intermittent motion between a first and second counter wheel and which has a detent mechanism and a movable pawl which selectively allows relative motion between the counter wheels.

This invention relates in general to counters and in particular to a counter mechanism which allows intermittent motion between adjacent counter wheels.

It is often necessary in counters to have a pair of wheels which move at different speeds but which must occasionally be moved together to allow a transfer. For example, tens and units counter wheels turn at a ratio of 10:1. Other applications might require a units wheel and a 0 and 0.5 counter wheel. In such instances the 0 and 0.5 counter wheel would turn two positions for each one that the units wheel would turn.

The present invention provides a novel counter mechanism which is simple and inexpensive.

Another object of the invention is to provide a counter mechanism with a transfer which utilizes a spring detent and a locking pawl.

A feature of this invention is found in the provision for a fixed shaft with a pivoted pawl mounted between a pair of counter wheels, one of which has a number of cammed surfaces for moving the pawl into locking engagement with depressions in the other counter wheel such that when the cam is in engagement with the pawl, the pawl locks one wheel and slides relative to the cam so that the two counter wheels do not move together. When the pawl is out of engagement with the cam, a second detent means locks the two counter wheels together and they move together.

Further objects, features, and advantages of this invention will become apparent from the following description and claims when read in view of the accompanying drawings, in which:

Figure 1:
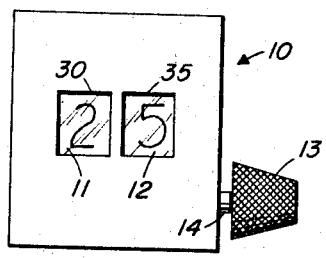
FIGURE 1 illustrates a counter mechanism according to this invention.

FIGURE 1 illustrates a frame 10 on which a pair of counter wheels 11 and 12 are visible through windows 30 and 35 and which have suitable indicia printed on them. A drive knob 13 is connected to a shaft 14 mounted in the frame member to drive the counter.

Figure 2:
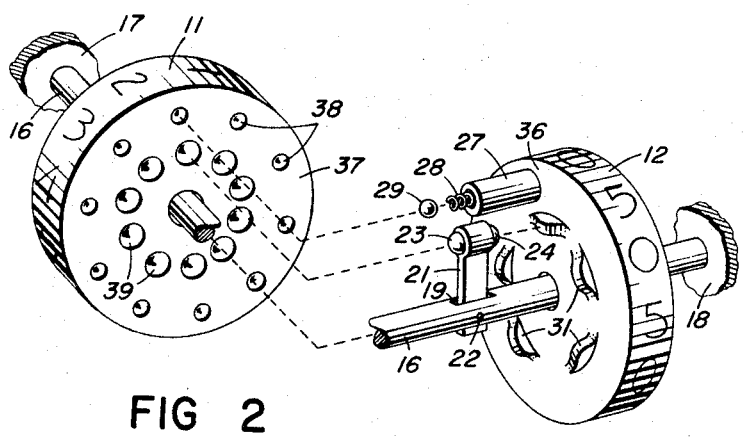
FIGURE 2 is an exploded view of the counter mechanism of this invention.
Figure 3:
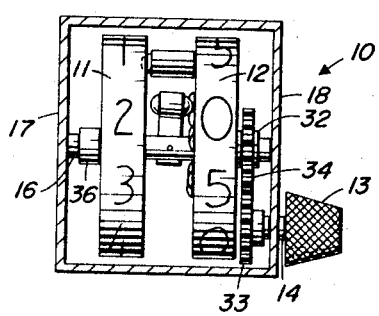
FIGURE 3 is a sectional view of the invention illustrating the condition when the counter wheels are turning together; and, FIGURE 4 is a view illustrating the condition when the counter wheels are not turning together.

As best shown in FIGURE 3, frame member has a first shaft 16 which extends between end walls 17 and 18 and is nonrotatably attached thereto. As best shown in FIGURE 2, a transverse opening 19 is formed through shaft 16 and a pawl 21 is supported by pin 22 within the slot 19. Pawl 21 has a pair of rounded surfaces 23 and 24 mounted in its extending end. It is to be realized that the pawl 21 may pivot longitudinally relative to shaft 16 but cannot rotate relative to the frame member 10.

The counter wheel 12 has printed about its periphery suitable indicia which for illustrative purposes could be, alternately, 0.5 and 0. Attached to the face 26 of counter wheel 12 which faces counter wheel 11 is a sleeve 27 formed with an opening in which a spring 28 is mounted. A detent ball 29 is inserted in the sleeve 27 above the spring 28 and the end of sleeve is upset so as to lock the ball 29 into the sleeve but allow it to move outwardly and inwardly relative thereto.

Also formed on the face 26 of the counting wheel 12 are cam surfaces 31. The cam surfaces 31 engage the rounded surface 24 of pawl 21 to pivot it to the left relative to FIGURES 2, 3 and 4 when the pawl engages the cam surfaces.

Figure 4:
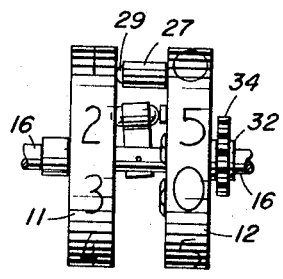

As best shown in FIGURES 3 and 4, the counter wheel 12 is formed with a sleeve 32 which fits over shaft 16 and is rotatably supported on shaft 16. The shaft 14 carries a gear 33 which meshes with a gear 34 mounted on the sleeve 32 of the counter wheel 12. Thus, rotation of the knob 13 causes the counter wheel 12 to turn.

The second counter wheel 11 has a sleeve 36 and is rotatably mounted on the shaft 16. Both counter wheels are rotatably supported on shaft 16 such that they do not move longitudinally on the shaft. The face 37 of counter wheel 11 is formed with a first plurality of openings 38 about a first concentric circle in alignment with the ball 29 such that the detent may lock the counter wheels together.

A second plurality of openings is formed in the face 37 of counter wheel 11 and is designated as 39. These depressions are in alignment with the rounded surface 23 of the pawl 21. Suitable indicia is printed on the face of counter wheel 11 and visible through the window 30 of the frame 10 as shown in FIGURE 1. Likewise, indicia is printed on counter wheel 12 and is visible through the window 35 as shown in FIGURE 1.

In operation, the counters illustrated will indicate a particular unit in window 30 which might, for example, be 0 through 9 and will indicate in window 35 either 0 or .5. Thus, the counter in this case would cover a range from 0 to 9.5 in 20 increments.

As the knob 13 is turned, the counter wheel 12 will be driven by gears 33 and 34. Assuming that at the start of rotation a 0 is visible in window 35 the counter wheel 11 will be held by the mechanism of this invention while the counter wheel 12 is rotated until a .5 is illustrated in in window 35. This is accomplished by the pawl 21 which engages one of the cams 31 on the face of the counter wheel 12 which moves the rounded surface 23 of the pawl 21 into engagement with one of the openings 39 in the face 37 of the counter wheel 11. Since the shaft 16 and the pawl 21 are fixed relative to the frame, the pawl 21 locks counter wheel 11 so that it does not turn during this time. As the counter wheel 12 is rotated further, the cam 31 will move out of engagement with the pawl 21 allowing the pawl 21 to move to the right relative to the drawing such that its locking relationship with counter wheel 11 no longer exists. Then the detent 29 will engage an opening 38 in the face 37 of the counter wheel 11 to lock counter wheel 11 to counter 12 and they will move together until pawl 21 engages another cam 31. The result is that the counter wheel 11 will move half the angular distance of counter wheel 12 in this particular example and it will move intermittently such that when it does move it moves at the same speed as wheel 12 but it is locked by the pawl 21 to the shaft 16 about half the time due to the action of the cams 31 on the pawl 21 while the counter wheel 12 continues to rotate. The openings 38 and 39 and the cams 31 are positioned so that the desired transfers occur.

It is seen that this invention provides a counter mechanism with a small number of parts and which is inexpensive and easy to construct.

Although this invention has been described with respect to a particular embodiment thereof, it is not to be so limited, as changes and modifications may be made therein which are within the spirit and scope of the invention as defined by the appended claims.

I claim:

1. A counter mechanism comprising: a frame member, a first shaft nonrotatably attached to the frame member and formed with a transverse slot, a pawl pivotally supported in the transverse slot, a pair of counter wheels rotatably supported on the nonrotatable shaft, a plurality of cammed surfaces formed on a first one of the counter wheels and engageable with the pawl, locking means formed on the face of the other counter wheel such that the pawl locks the second counter wheel to the nonrotatable shaft when it engages a cam on the other counter wheel, and means for intermittent locking the second counter wheel to the first counter wheel at times when the pawl is not in locking arrangement with the second counter wheel.

2. In apparatus according to claim 1 wherein the means for locking the second counter wheel to the first counter wheel comprises a spring loaded detent extending from the first counter wheel and engageable with locking means formed on the surface of the second counter wheel.

3. In apparatus according to claim 2 wherein the locking means on the second counter wheel comprises depressions.

4. A transfer mechanism comprising a frame member, a pair of counter wheels rotatably supported by the frame member, a pawl mounted on the frame member and movable between the counter wheels, cam means on one counter wheel engageable with the pawl to move it into locking engagement with a first plurality of depressions formed in the other counter wheel, and means connecting the two counter wheels so that they move together when the pawl is not in the locking position said means connecting the two counter wheels including a detent attached to said one wheel engageable with a second plurality of depressions formed in said other wheel.

References Cited

UNITED STATES PATENTS

| 611,139 | 9/1898 | Orr | 235—143 |
| 672,185 | 4/1901 | Dement | 235—143 |
| 1,578,260 | 3/1926 | Brandt | 235—131 |
| 3,000,560 | 9/1961 | Clancy | 235—131 |
| 3,038,659 | 6/1962 | Unterberger | 235—117 |
| 3,189,273 | 6/1965 | Hellen | 235—117 |

RICHARD B. WILKINSON, *Primary Examiner.*

STEPHEN J. TOMSKY, S. A. WAL, *Examiners.*